US009061930B2

(12) United States Patent
Linnot et al.

(10) Patent No.: US 9,061,930 B2
(45) Date of Patent: Jun. 23, 2015

(54) CHROMIUM OXIDE REFRACTORY MATERIAL (75) Inventors: Cyril Linnot, Lyons (FR); Lionel Moitrier, Mallemort (FR); Yves Marcel Leon Boussant Roux, Montfavet (FR); Olivier Citti, Wellesley, MA (US); Richard Avedikian, Robion (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 243 days.

(21) Appl. No.: 13/812,041

(22) PCT Filed: Jul. 22, 2011

(86) PCT No.: PCT/IB2011/053286
§ 371 (c)(1),
(2), (4) Date: Mar. 14, 2013

(87) PCT Pub. No.: WO2012/020344
PCT Pub. Date: Feb. 16, 2012

(65) Prior Publication Data
US 2013/0167592 A1 Jul. 4, 2013

(30) Foreign Application Priority Data

Aug. 10, 2010 (FR) ..................................... 10 56540
Aug. 10, 2010 (FR) ..................................... 10 56541

(51) Int. Cl.
*C04B 35/12* (2006.01)
*C03B 5/43* (2006.01)
*C04B 35/105* (2006.01)
*C04B 35/106* (2006.01)
*C04B 35/626* (2006.01)

(52) U.S. Cl.
CPC ............. *C03B 5/43* (2013.01); *Y10T 428/2982* (2015.01); *C04B 35/105* (2013.01); *C04B 35/106* (2013.01); *C04B 35/12* (2013.01); *C04B 35/6261* (2013.01); *C04B 35/6262* (2013.01); *C04B 35/62665* (2013.01); *C04B 2235/3201* (2013.01); *C04B 2235/3208* (2013.01); *C04B 2235/3217* (2013.01); *C04B 2235/3232* (2013.01); *C04B 2235/3241* (2013.01); *C04B 2235/3244* (2013.01); *C04B 2235/3418* (2013.01); *C04B 2235/5409* (2013.01); *C04B 2235/5427* (2013.01); *C04B 2235/5436* (2013.01); *C04B 2235/5445* (2013.01); *C04B 2235/72* (2013.01); *C04B 2235/77* (2013.01); *C04B 2235/96* (2013.01); *C04B 2235/963* (2013.01); *C04B 2235/9692* (2013.01)

(58) Field of Classification Search
CPC .................. C04B 35/12; C03B 5/43

USPC .................. 501/127, 128, 132; 65/374.13
See application file for complete search history.

(56) References Cited

U.S. PATENT DOCUMENTS

| | | | |
|---|---|---|---|
| 4,039,344 A | 8/1977 | Nishikawa et al. | |
| 4,158,569 A | 6/1979 | Brothers et al. | |
| 4,490,474 A | 12/1984 | Staten | |
| 4,544,643 A * | 10/1985 | Fraser ........................... | 501/127 |
| 4,823,359 A | 4/1989 | Ault et al. | |
| 5,106,795 A | 4/1992 | Drake et al. | |
| 6,352,951 B1 * | 3/2002 | Mossal et al. ................. | 501/105 |
| 7,754,633 B2 * | 7/2010 | Prior et al. .................... | 501/132 |
| 2013/0167592 A1 | 7/2013 | Linnot et al. | |

FOREIGN PATENT DOCUMENTS

FR 2 647 435 11/1990

OTHER PUBLICATIONS

Popov O.N., "Refractory Materials for Glass-Furnace Tanks," State Scientific Research Institute for Glass, pp. 15-17, Translated from Steklo 1 Keramika, No. 1, pp. 10-12, Jan. 1973, XP-002630976.

Guo et al., Zongqi, "Investigation and Application of $Cr_2O_3$—$Al_2O_3$—$ZrO_2$ Refractories for Slagging Coal Gasifiers," China's Refractories, vol. 6, No. 4, 1977, Luoyang Institute of Refractories Research, Luoyang, Henan 471039, China, pp. 18-22.

Guo et al., Zong-Qi, "Effect of Coal Slag on the Wear Rate and Microstructure of the $ZrO_2$—Bearing Chromia Refractories," Ceramics International 23 (1997) pp. 489-496.

Krauth, A. et al., "Some Experiences With Chromic-Oxide Refractory Materials," Glass, Feb. 1988, pp. 76-78.

Preliminary Search Report and Written Opinion issued Apr. 11, 2011 in French Patent Application No. 1056540 (with translation).

International Search Report and Written Opinion issued Nov. 24, 2011 in International Patent Application No. PCT/IB2011/053287 (with translation).

(Continued)

*Primary Examiner* — Karl Group
(74) *Attorney, Agent, or Firm* — Oliff PLC (57) ABSTRACT A device selected from among a glass furnace and a channel for dispensing the glass comprising a block and/or a coating made of a sintered material obtained by sintering a particular mixture comprising a chromium oxide content, indicated as "CrT", of between 10% and 82%. The die fraction is such that $0.39 \cdot (CrT) + 24 < CrM < 0.39 \cdot (CrT) + 52$, CrM denoting the chromium oxide content by weight of the die fraction in wt % on the basis of the oxides of the die, and the aggregate is such that $xII \geq 97\%$, $xIII \geq 70\%$, and $xIV \leq xIII - 70\%$, CrG denoting the chromium oxide content by weight of one grain in wt % on the basis of the oxides of said grain.

19 Claims, 2 Drawing Sheets

(56) References Cited

OTHER PUBLICATIONS

International Search Report and Written Opinion issued Nov. 24, 2011 in International Patent Application No. PCT/IB2011/053286 (with translation).
Preliminary Search Report and Written Opinion issued Apr. 1, 2011 in French Patent Application No. 1056541 (with translation).
U.S. Appl. No. 13/811,552 filed Jan. 22, 2013.
User manual of the SYSMEX FPIA 3000,Flow particle image analysis of size and shape, no date.
Traite de ceramiques et materiaux, C. A. Jouenne, Editions Septima. Paris (1984), pp. 403 to 405.
Apr. 3, 2015 Office Action issued in U.S. Appl. No. 13/811,552.

* cited by examiner

CHROMIUM OXIDE REFRACTORY MATERIAL

FIELD OF TECHNOLOGY

The invention relates to a particulate mixture comprising chromium oxide, to a sintered product manufactured from said particulate mixture and to a method of manufacture of said sintered refractory product. This refractory product can be used in particular in an environment in which it is in contact with molten glass.

BACKGROUND

Among refractory products, a distinction is made between fused-cast products and sintered products. In contrast to sintered products, fused-cast products most often comprise a very abundant intergranular vitreous phase, filling the network of crystalline grains. The problems encountered in their respective applications in the case of sintered products and in the case of fusion-cast products, and the technical solutions adopted for solving them, are therefore generally different. Moreover, owing to the large differences between the manufacturing processes, a composition developed for making a fused-cast product is not a priori usable as such for making a sintered product, and vice versa.

Sintered products are obtained by mixing suitable raw materials and then crude forming of this mixture and baking of the resultant crude article at a temperature and for a time sufficient to obtain sintering of said crude article. The sintered products are intended for very varied industries, depending on their chemical composition.

Refractory products comprising chromium oxide are used conventionally in applications where they are subject to extreme chemical aggression, for example in glass furnaces, in particular as furnace tank blocks, or in furnaces in which they are in contact with slag.

The use of said refractory products in contact with slag or with molten glass is known for example from U.S. Pat. No. 6,352,951 (incinerating furnaces containing blocks based on alumina and chrome) and from U.S. Pat. No. 4,823,359 (glass furnaces with linings consisting of alumina and chrome).

The corrosion due to a slag is different from the corrosion caused by molten glass and therefore a product suitable for being brought in contact with slag is not necessarily suitable for an application in which it would come in contact with molten glass.

However, there is a constant need to increase the life of these products.

The aim of the invention is to meet this need.

SUMMARY OF THE INVENTION

The invention proposes a particulate mixture consisting of a matrix fraction and granulate constituted respectively of particles having a size less than or equal to 50 μm, so-called "matrix particles", and particles having a size greater than 50 μm, so-called "grains", the matrix fraction representing more than 10% and less than 45% of the weight of the particulate mixture,
said particulate mixture having a content of chromium oxide, designated "$Cr_T$", greater than or equal to 10% and less than or equal to 82%, preferably less than or equal to 80%, in percentage by weight based on the oxides of the refractory mixture, the matrix fraction being such that $$0.39 \cdot (Cr_T) + 24 < Cr_M < 0.39 \cdot (Cr_T) + 52 \quad \text{(I)},$$

$Cr_M$ denoting the content by weight of chromium oxide in the matrix fraction, in percentage by weight based on the oxides of the matrix fraction, and
the granulate being such that $x_{II} \geq 97\%$, $x_{III} \geq 70\%$, and $x_{IV} \leq 5$ $x_{III} - 70\%$
$Cr_G$ denoting the content by weight of chromium oxide in a grain, in percentage by weight based on the oxides of said grain,
$x_{II}$ denoting the amount, in percentage by weight based on the granulate, of grains meeting the following condition (II):

if $10\% \leq Cr_T \leq 30\%$, then $Cr_G \leq 0.018 \cdot (Cr_T)^2 - 0.390 \cdot (Cr_T) + 58.8$;

if $30\% < Cr_T \leq 60\%$, then $Cr_G \leq 1.22 \cdot (Cr_T) + 26.7$;

if $60\% < Cr_T \leq 82\%$, in particular $60\% < Cr_T \leq 80\%$, then $Cr_G \leq 100$, \quad (II)

$x_{III}$ denoting the amount, in percentage by weight based on the granulate, of grains meeting the following condition (III):

if $10\% \leq Cr_T \leq 30\%$, then $0.018 \cdot (Cr_T)^2 - 0.390 \cdot (Cr_T) + 9.10 \leq Cr_G \leq 0.018 \cdot (Cr_T)^2 - 0.390 \cdot (Cr_T) + 25.10$;

if $30\% < Cr_T \leq 60\%$, then $1.17 \cdot (Cr_T) - 21.5 \leq Cr_G \leq 1.17 \cdot (Cr_T) - 5.5$;

if $60\% < Cr_T \leq 82\%$, in particular $60\% < Cr_T \leq 80\%$, then $1.17 \cdot (Cr_T) - 21.5 \leq Cr_G \leq 1.67 \cdot (Cr_T) - 35.5$, \quad (III)

$x_{IV}$ denoting the amount, in percentage by weight based on the granulate, of grains meeting the following condition (IV):

If $10\% \leq Cr_T \leq 30\%$, then $0.018 \cdot (Cr_T)^2 - 0.390 \cdot (Cr_T) + 9.10 > Cr_G$;

If $30\% < Cr_T \leq 60\%$, then $1.17 \cdot (Cr_T) - 21.5 > Cr_G$;

If $60\% < Cr_T \leq 82\%$, in particular $60\% < Cr_T \leq 80\%$, then $1.17 \cdot (Cr_T) - 21.5 > Cr_G$. \quad (IV)

The response traditionally proposed for increasing the life of products that are in contact with molten glass consists of improving the corrosion resistance. The inventors, however, followed a new path, in that they tried to make the wear of the products more uniform. They in fact observed that "holes" on the surface in contact with the molten glass, corresponding to zones of maximum wear, limit the service life of the products, regardless of their composition.

They found that the conditions imposed on a product manufactured from a particulate mixture according to the invention lead advantageously to a particularly uniform corrosion profile.

A particulate mixture according to the invention can also have one or more of the following preferred, optional characteristics:

$-0.39 \cdot (Cr_T) + 29 < Cr_M < 0.39 \cdot (Cr_T) + 47$ \quad (V);

$-0.39 \cdot (Cr_T) + 32 < Cr_M < 0.39 \cdot (Cr_T) + 44.5$ \quad (VI);

$x_{II}$ is greater than 98%, preferably greater than 99%, preferably roughly equal to 100%;
$x_{III}$ is greater than 85% and $x_{IV}$ is less than 1%, preferably roughly equal to 0%;

At least 70 wt % of the grains have, in percentages by weight based on the oxides, a chromium oxide content meeting the following condition (VII):

If $10\% \leq Cr_T \leq 30\%$, then $0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10$;

If $30\% < Cr_T \leq 60\%$, then $1.17 \cdot (Cr_T) - 17.5 \leq Cr_G \leq 1.17 \cdot (Cr_T) - 9.5$;

If $60\% < Cr_T \leq 82\%$, in particular $60\% < Cr_T \leq 80\%$, then $1.67 \cdot (Cr_T) - 51.5 \leq Cr_G \leq 1.67 \cdot (Cr_T) - 39.5$;

At least 70 wt % of the grains have, in percentage by weight based on the oxides, a chromium oxide content meeting the following condition (VIII):

If $10\% \leq Cr_T \leq 30\%$, then $0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10$;

If $30\% < Cr_T \leq 60\%$, then $1.17 \cdot (Cr_T) - 17.5 \leq Cr_G \leq 1.17 \cdot (Cr_T) - 9.5$;

If $60\% < Cr_T \leq 82\%$, in particular $60\% < Cr_T \leq 80\%$, then $1.67 \cdot (Cr_T) - 47.5 \leq Cr_G \leq 1.67 \cdot (Cr_T) - 39.5$;

In a particular embodiment, the matrix fraction has a chromium oxide content "$Cr_M$" meeting condition (VI) and at least 70 wt % of the grains have a chromium oxide content "$Cr_G$" meeting condition (VIII);

In a second particular embodiment, the matrix fraction has a chromium oxide content "$Cr_M$" meeting condition (VI) and at least 99 wt % of the grains have a chromium oxide content "$Cr_G$" meeting condition (VIII);

At least 90%, preferably at least 95%, preferably at least 99%, preferably roughly 100 wt % of the grains have a chromium oxide content "$Cr_G$" meeting condition (III) and/or condition (VII);

The grains and/or matrix particles containing chromium oxide are preferably sintered particles;

The particles of the granulate and/or of the matrix fraction are sintered particles.

The invention also relates to a method of making a sintered refractory product, comprising the following successive steps:

A) preparing an initial charge by mixing a particulate mixture according to the invention and water;
B) forming said initial charge so as to form a preform;
C) sintering said preform.

The invention also relates to a sintered product obtained by sintering a particulate mixture according to the invention, in particular according to steps A) to C) below.

Preferably, this product has a density above 3.1 g/m³, or even above 3.3 g/cm³ and/or below 4.5 g/cm³, or even below 4.3 g/cm³.

The invention relates finally to a device selected from a glass furnace, a regenerator, and a glass distribution channel, also called "feeder channel", having a block and/or a lining of a sintered product according to the invention.

Definitions

The "matrix fraction" consists of particles of size less than or equal to 50 μm, so-called "matrix particles". These particles are intended to make up the matrix of the refractory product. The complementary fraction, consisting of particles larger than 50 μm or "grains" is called "granulate".

The "size of a particle" means the dimension of a particle given conventionally by a characterization of granulometric distribution performed with a laser granulometer. The laser granulometer used for the examples is a Partica LA-950 from the company HORIBA.

The "circularity" of a particle observed is the ratio $P_D/P_r$, with $P_r$ denoting the perimeter of the particle as observed, and $P_D$ denoting the perimeter of the disk having the same area as that of the particle as observed. The circularity depends on the direction of observation.

Figure 1A:
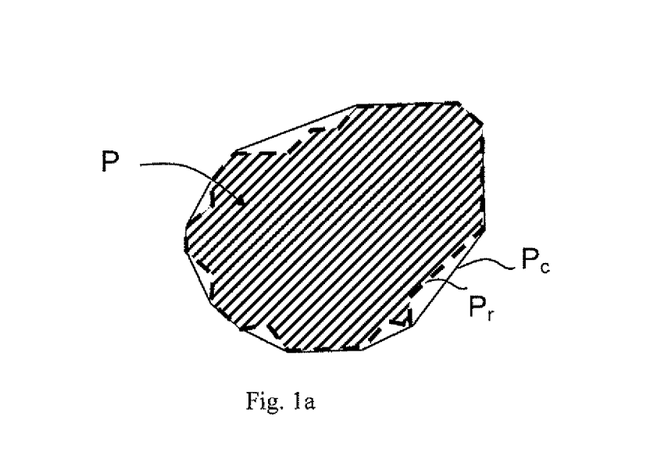
FIGS. 1a and 1b illustrate the method employed for measuring the convexity and the circularity, respectively.
Figure 1B:
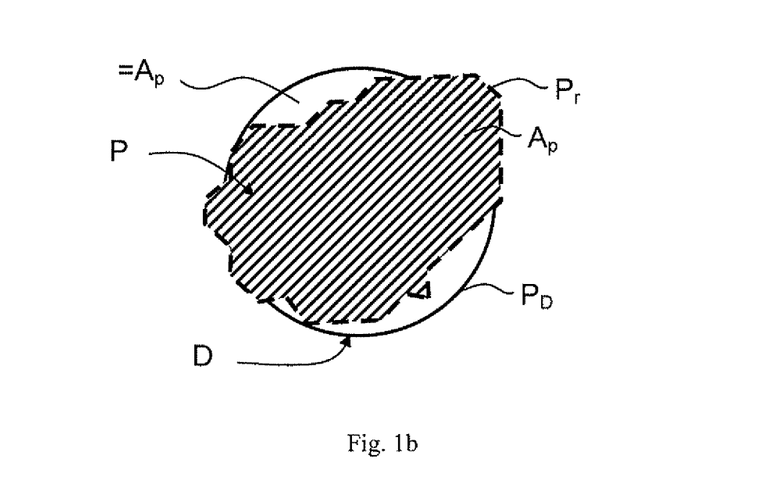

As shown in FIG. 1b, the circularity "Ci" of a particle P is evaluated by determining the perimeter $P_D$ of the disk D having an area equal to the area $A_p$ of the particle P on a photograph of said particle. The perimeter $P_r$ of said particle is also determined. The circularity is equal to the ratio $P_D/P_r$. Thus $$Ci = \frac{2 * \sqrt{\pi A_p}}{Pr}.$$

The more elongated the particle, the lower the circularity. The user manual of the SYSMEX FPIA 3000 also describes this procedure (see "detailed specification sheets" on www.malvern.co.uk).

The percentiles or "centiles" 10 ($Ci_{10}$) and 50 ($Ci_{50}$) of a set of particles are the circularities of the particles corresponding to the percentages, by number, of 10% and 50% respectively, on the cumulative distribution curve of the circularities of the particles of said set, the particle circularities being classified in increasing order. For example, 10 wt % of the particles of this set have a circularity below $Ci_{10}$. The percentiles can be evaluated using an instrument of the type Morphologi® G3 marketed by the company Malvern. $Ci_{50}$ is also called "median circularity".

By extension, these percentiles are used for characterizing the distribution of the circularities of the particles of a sintered material obtained from this powder.

For determining the percentiles $Ci_{10}$ and $Ci_{50}$ the set of particles is poured onto a flat plate and observed perpendicularly to said plate. The number of particles recorded is greater than 250, which makes it possible to obtain roughly identical percentiles, regardless of the manner in which the particles were poured onto the plate. A method of determination is described in more detail in the examples given below.

The "convexity" of a particle observed is the ratio $P_c/P_r$, with $P_c$ denoting the convex perimeter of the particle as observed and $P_r$ denoting the perimeter of said particle as observed, as shown in FIG. 1a. The convexity of a particle depends on the direction of observation.

The percentiles or "centiles" 10 ($Co_{10}$) and 50 ($Co_{50}$) of a set of particles are the convexities of particles corresponding to the percentages, by number, of 10% and 50%, respectively, on the cumulative distribution curve of the convexities of the particles of said set, the particle convexities being classified in increasing order. For example, 10 wt % of the particles of this set have a convexity below $Co_{10}$. The percentiles can be evaluated using an instrument of the type Morphologi® G3 marketed by the company Malvern. $Co_{50}$ is also called "median convexity".

By extension, these percentiles are used for characterizing the distribution of the convexities of the particles of a sintered material obtained from this powder.

To determine the percentiles $Co_{10}$ and $Co_{50}$ the set of particles is poured onto a flat plate and observed perpendicularly to said plate. The number of particles is greater than 250, which makes it possible to obtain roughly identical percentiles, regardless of the manner in which the particles were poured onto the plate. A method of determination is described in more detail in the examples given below.

A "granule" is a particle having a circularity above 0.85.

"Agglomerated particle" or "agglomerate" means a particle formed by a set of other particles. Agglomerated particles can notably be obtained by sintering or by means of a binder.

Unless stated otherwise, all the percentages are percentages by weight.

The chemical analyses or the chemical compositions of the particles refer to the composition of each of said particles. The chemical analyses or the chemical compositions of a "particulate mixture" or of a "powder" refer to the average composition, of the set of particles in question. Unless stated otherwise, these compositions are based on the oxides.

Of course, $Cr_G$ is always less than or equal to 100%, even when one of the above relations leads to an upper limit that exceeds 100%.

BRIEF DESCRIPTION OF THE DRAWINGS

Other features and advantages of the invention will become apparent on reading the detailed description and on examining the drawing in which.

DETAILED DESCRIPTION

Particulate Mixture

A particulate mixture according to the invention can be manufactured from a mixture of powders of raw materials having suitable compositions and granulometric distributions.

Preferably, the particulate mixture has a content of $Cr_2O_3+Al_2O_3$ above 60%, preferably above 65%, preferably above 70%, preferably above 80%, or even above 90%, or even above 92%, or even above 94%, in percentage by weight based on the oxides.

In one embodiment, the particulate mixture has a chromium oxide content above 15%, above 20%, above 25%, above 30%, above 35%, above 40%, and/or below 75%, below 70%, or below 65%, below 50%. In one embodiment, the chromium oxide content is above 50%, or even above 55%.

In one embodiment, the particulate mixture has a content of $Al_2O_3$ above 3%, above 5%, above 10%, above 15%, above 20%, above 25% and/or below 85%, below 80%, below 75%, below 70%, below 65%, below 60%, below 55%, or even below 35%. In one embodiment, the particulate mixture has a content of $Al_2O_3$ above 35%, above 40%, or even above 45%.

The silica content of the particulate mixture can be above 0.1%, above 0.5%, above 0.7%, above 1%, and/or below 8%, below 5%, below 4%, below 3%, below 2%, or even below 1.5%.

The zirconia content of the particulate mixture can be below 10%, below 5%, below 1%, below 0.5%, or below 0.1%.

The titanium oxide content of the particulate mixture can be above 0.3%, above 0.5%, above 1%, and/or below 4%, below 3%, below 2%, below 1.5%, or below 1.3%. In one embodiment, the titanium oxide content of the particulate mixture is below 0.2%.

Preferably, the total content of $Cr_2O_3$, $Al_2O_3$, $ZrO_2$, $SiO_2$ and $TiO_2$, in the particulate mixture, is above 90%, above 92%, above 94%, above 96%, above 98%.

The granulometric distribution is not limiting. It can in particular be adjusted to the apparent density of the sintered refractory product that is to be produced.

In one embodiment, the ratio $Cr_M/Cr_G$ is above 1.05, above 1.1, above 1.15, above 1.2, above 1.3, above 1.4, above 1.5, above 1.6, and/or below 7, below 6.5, below 6.0, below 5.5, below 5, or below 4.5 or below 4.0, below 3.5, below 3.0, below 2.5, below 2, below 1.7. In one embodiment, the ratio $Cr_M/Cr_G$ is below 0.95, below 0.9, below 0.85, below 0.8, below 0.75, below 0.7, below 0.65, below 0.6, below 0.55.

Matrix Fraction

A particulate mixture according to the invention preferably comprises more than 15%, more than 20%, or even more than 25%, and/or less than 40%, or even less than 35%, or even less than 30% of the matrix particles, in percentage by weight based on the particulate mixture.

Preferably, the matrix fraction and preferably at least 80 wt % of the matrix particles have a chemical composition such that, in percentages by weight based on the oxides and for a total of 100%:

$Cr_2O_3+Al_2O_3+ZrO_2+MgO+Fe_2O_3+SiO_2+TiO_2+CaO \geq 90\%$, preferably $Cr_2O_3+Al_2O_3+ZrO_2+MgO+Fe_2O_3+SiO_2+TiO_2+CaO \geq 95\%$, and $Cr_2O_3+Al_2O_3+MgO \geq 50\%$, and $Cr_2O_3 \geq 7\%$, and $15\% \geq SiO_2 \geq 0.1\%$, and other oxides: $\leq 10\%$, preferably $\leq 5\%$.

Preferably, at least 90 wt % of the matrix particles are smaller than 40 μm, preferably smaller than 30 μm, preferably smaller than 20 μm, or even smaller than 10 μm.

Preferably, the composition of the matrix fraction is such that the total content $Cr_2O_3+Al_2O_3+MgO$ is greater than 65%, preferably greater than 70%, preferably greater than 80%, or even greater than 90%, in percentage by weight based on the oxides; and/or the content of $SiO_2$ is below 12%, preferably below 10%, preferably below 8%, preferably below 6%, preferably below 5%, or even below 4%, or even below 3%; and/or the content of $TiO_2$ is below 7%, or even below 4%, or even below 3%, or even below 2%; and/or the content of "other oxides" is below 5%, preferably below 4%, preferably below 3%, preferably below 2%, preferably below 1%.

In certain embodiments, the composition of the matrix fraction is such that $Cr_2O_3+Al_2O_3>80\%$, $Cr_2O_3+Al_2O_3>90\%$, or even $Cr_2O_3+Al_2O_3>95\%$.

In certain embodiments, the composition of the matrix fraction is such that the content of $TiO_2$ is below 0.2%.

In certain embodiments, the composition of the matrix fraction is such that the content of $Al_2O_3$ is above 5%, above 7.5%, above 10%, above 15% and/or is below 72%, below 65%, below 60%, below 50%.

Preferably, the matrix particles contain a $Cr_2O_3$—$Al_2O_3$ solid solution and/or a spinel based on $Cr_2O_3$—$MgO$, for example $MgCr_2O_4$, and/or a spinel based on $Cr_2O_3$-iron oxide, for example $FeCr_2O_4$, and/or a spinel based on $Al_2O_3$—$MgO$, for example $MgAl_2O_4$, and/or a spinel based on $Al_2O_3$-iron oxide, for example $FeAl_2O_4$, and/or at least one of the solid solutions thereof.

Also preferably, the sum of the contents of oxides in the particles of the matrix fraction represents more than 90%, more than 95%, or even roughly 100% of the weight of said matrix particles.

The matrix fraction preferably consists of particles of chromium oxide on the one hand and, on the other hand, particles of alumina and/or particles of zirconia and/or particles of magnesia and/or particles of iron oxide and/or particles of titanium oxide and/or particles of silica and/or particles of calcium oxide. Preferably, the matrix fraction consists of particles composed of chromium oxide on the one hand and, on the other hand, of alumina and/or of zirconia and/or of magnesia and/or of iron oxide and/or of titanium oxide and/or of silica and/or of calcium oxide, or of mixtures of said particles. For example, the matrix fraction can be a mixture of particles of chromium oxide and particles of alumina, but can also consist of particles of chromium oxide and alumina, for example in the form of a solid solution. Preferably, the matrix particles are composed of chromium oxide on the one hand and, on the other hand, of alumina and/or of calcium oxide and/or of zirconia and/or of titanium oxide.

The amount of matrix particles of zirconia is preferably below 10%, preferably below 8%, preferably below 5%, preferably below 3%, in percentage by weight based on the oxides of the particulate mixture.

The median size of the matrix particles can be less than 25 microns, less than 15 microns, less than 10 microns, or even less than 7 microns.

In one embodiment, the particulate mixture does not contain particles of zirconia, in particular matrix particles of zirconia.

Granulate

A particulate mixture according to the invention preferably comprises less than 85%, or even less than 80%, or even less than 75% of grains, in percentage by weight based on the particulate mixture.

The granulate preferably consists of particles of chromium oxide on the one hand and, on the other hand, particles of alumina and/or particles of zirconia and/or particles of magnesia and/or particles of iron oxide and/or particles of titanium oxide and/or particles of silica. Preferably, the granulate consists of particles composed of chromium oxide on the one hand and, on the other hand, of alumina and/or of zirconia and/or of magnesia and/or of iron oxide and/or of titanium oxide and/or of silica, or of mixtures of said particles. For example, the granulate can be a mixture of particles of chromium oxide and of particles of alumina, but can also be a mixture of particles of chromium oxide and of alumina, for example in the form of a solid solution. Preferably, the grains are composed of chromium oxide on the one hand and, on the other hand, of alumina and/or of zirconia and/or of titanium oxide.

Also preferably, the particulate mixture does not contain particles of zirconia with a size between 50 μm and 500 μm, preferably does not contain particles of zirconia in the granulate. Advantageously, this results in improved stoning resistance of the refractory product obtained from the refractory mixture in contact with molten glass.

The standard deviation of the distribution of the chromium oxide content of the grains is preferably less than 8, preferably less than 4, preferably less than 1.5, preferably less than 1, more preferably less than 0.75. The difference between the lowest and the highest contents of chromium oxide is preferably less than 9%, preferably less than 6%, preferably less than 4.5%. All the grains then have similar contents of chromium oxide.

More preferably, whatever constituent is considered, provided that its content is greater than 1% in percentage by weight based on the oxides, the standard deviation of the distribution of its content between the various grains is less than 8, preferably less than 4, preferably less than 1.5, preferably less than 1, more preferably less than 0.75. All the grains then have similar compositions.

Preferably, the granulate has an apparent density above 85% of the theoretical density, preferably above 88%, preferably above 90%, preferably above 91%, preferably above 92% of the theoretical density, or even above 93%, or even above 94%, or even above 95%, or even above 96% of the theoretical density.

Preferably, the granulate has an open pore volume below 10%, preferably below 6%, preferably below 5%, preferably below 3%, preferably below 2%, preferably below 1%, or even below 0.7%, or even below 0.6%.

The granulate can contain granules, i.e. particles that are roughly spherical. Preferably, the granulate has a median circularity above 0.87. Preferably, the granules are agglomerated particles, in particular sintered particles.

In a particular embodiment, at least 80%, preferably at least 90%, preferably at least 95%, preferably at least 99%, or even roughly 100% by number of the grains are granules.

Preferably, the granulate and preferably at least 80 wt % of the grains, preferably of the granules of the granulate, have a chemical composition such that, in percentages by weight based on the oxides and for a total of 100%:

$Cr_2O_3+Al_2O_3+ZrO_2+MgO+Fe_2O_3+SiO_2+TiO_2 \geq 90\%$, preferably $Cr_2O_3+Al_2O_3+ZrO_2+MgO+Fe_2O_3+SiO_2+TiO_2 \geq 95\%$, and $Cr_2O_3+Al_2O_3+MgO \geq 60\%$, and $Cr_2O_3 \geq 9\%$, and $20\% \geq SiO_2 \geq 0.5\%$, and other oxides: $\leq 10\%$, preferably $\leq 5\%$.

Preferably, at least 90 wt % of the grains, preferably of the granules, have a size greater than 100 μm, preferably greater than 200 μm, preferably greater than 300 μm, preferably greater than 400 μm.

The inventors discovered that, remarkably, a refractory product based on chromium oxide using said granules has good resistance to thermal shock and high corrosion resistance.

Preferably, the composition of the granulate is such that the total content $Cr_2O_3+Al_2O_3+MgO$ is above 65%, preferably above 70%, preferably above 80%, or even above 90%, or even above 92%, or even above 94%, in percentage by weight based on the oxides; and/or the content of $SiO_2$ is below 16%, preferably below 13%, preferably below 10%, preferably below 8%, preferably below 6%, preferably below 5%, or even below 4%, or even below 3% (advantageously, its densification is improved, but without its corrosion resistance being reduced); and/or the content of $TiO_2$ is above 0.5%, or even above 0.7%, and/or below 4%, preferably below 3%, below 2.2%, or even below 2%; and/or the content of "other oxides" is below 5%, preferably below 4%, preferably below 3%, preferably below 2%, preferably below 1%.

In certain embodiments, the composition of the granulate is such that $Cr_2O_3+Al_2O_3>80\%$, $Cr_2O_3+Al_2O_3>90\%$, or even $Cr_2O_3+Al_2O_3>95\%$.

In a first particular embodiment, the composition of the granulate, preferably of the granules of the granulate, is such that, in percentage by weight based on the oxides:

$Cr_2O_3$: 9% to 50%;

$Al_2O_3$: 45% to 88%;

$SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;

$Fe_2O_3 < 1\%$;
$MgO < 0.5\%$;
$0.5\% < TiO_2 < 4\%$, or even $TiO_2 < 2\%$;
$ZrO_2 < 5\%$;
other oxides <2%, preferably: other oxides <1%.

The content of $Cr_2O_3$ can be between 10% and 20%, between 20% and 30%, between 30% and 40%, or between 40% and 50%, and/or the content of $Al_2O_3$ can be between 45% and 55%, between 55% and 65%, between 65% and 75%, or between 75% and 88%.

In a second particular embodiment, the composition of the granulate, preferably of the granules of the granulate, is such that, in percentage by weight based on the oxides:
$Cr_2O_3$: 50% to 95%;
$Al_2O_3$: 2% to 45%;
$SiO_2 < 20\%$, preferably $SiO_2 < 16\%$, preferably $SiO_2 < 13\%$, preferably $SiO_2 < 10\%$, preferably $SiO_2 < 8\%$, preferably $SiO_2 < 6\%$, preferably $SiO_2 < 5\%$, preferably $SiO_2 < 4\%$, preferably $SiO_2 < 3\%$;
$Fe_2O_3 < 1\%$;
$MgO < 0.5\%$;
$0.5\% < TiO_2 < 4\%$, or even $TiO_2 < 2\%$;
$ZrO_2 < 5\%$;
other oxides <2%, preferably: other oxides <1%.

The content of $Cr_2O_3$ can be between 50% and 60%, between 60% and 70%, between 70% and 80%, or between 80% and 95%, and/or the content of $Al_2O_3$ can be between 2% and 12%, between 12% and 22%, between 22% and 32%, or between 32% and 45%.

In a third particular embodiment, the composition of the granulate, preferably of the granules of the granulate, is such that, in percentage by weight based on the oxides:
$Cr_2O_3$: 95% to 99%;
$Al_2O_3$: 0 to 4%;
$SiO_2 < 4\%$, preferably $SiO_2 < 3\%$, preferably $SiO_2 < 2\%$, preferably $SiO_2 < 1\%$;
$Fe_2O_3 < 4\%$;
$MgO < 0.5\%$;
$0.5\% < TiO_2 < 5\%$, or even $TiO_2 < 4\%$, or even $TiO_2 < 2\%$;
$ZrO_2 < 4\%$;
other oxides <2%, preferably: other oxides <1%.

In a fourth particular embodiment, the composition of the granulate, preferably of the granules of the granulate, is such that, in percentage by weight based on the oxides:
$Cr_2O_3$: 15% to 50%;
$Al_2O_3$: 10% to 80%;
$1\% < Fe_2O_3 < 30\%$, or even $3\% < Fe_2O_3$;
$0.5\% < MgO < 20\%$, preferably $MgO < 10\%$;
$SiO_2 < 20\%$, preferably $SiO_2 < 16\%$, preferably $SiO_2 < 13\%$, preferably $SiO_2 < 10\%$, preferably $SiO_2 < 8\%$, preferably $SiO_2 < 6\%$, preferably $SiO_2 < 5\%$, preferably $SiO_2 < 4\%$, preferably $SiO_2 < 3\%$;
$0.5\% < TiO_2 < 4\%$, or even $TiO_2 < 2\%$;
$ZrO_2 < 5\%$;
other oxides <2%, preferably: other oxides <1%.

The content of $Cr_2O_3$ can be between 15% and 25%, between 25% and 35%, or between 35% and 50%, and/or the content of $Al_2O_3$ can be between 10% and 20%, between 20% and 30%, between 30% and 40%, between 40% and 50%, between 50% and 60%, between 60% and 70%, or between 70% and 80%, and/or the content of $Fe_2O_3$ can be between 3% and 10%, between 10% and 20%, or between 20% and 30%.

Preferably, the grains, preferably the granules of the granulate, contain a $Cr_2O_3$—$Al_2O_3$ solid solution and/or a spinel based on $Cr_2O_3$—MgO, for example $MgCr_2O_4$, and/or a spinel based on $Cr_2O_3$-iron oxide, for example $FeCr_2O_4$, and/or a spinel based on $Al_2O_3$—MgO, for example $MgAl_2O_4$, and/or a spinel based on $Al_2O_3$-iron oxide, for example $FeAl_2O_4$, and/or at least one of the solid solutions thereof.

Also preferably, the sum of the contents of oxides in the grains, preferably the granules of the granulate, represents more than 90%, more than 95%, or even roughly 100% of the weight of said grains or granules.

In one embodiment, the granulate and the matrix fraction have roughly identical compositions. In one embodiment, these compositions are different.

In one embodiment, the granulate is constituted, to more than 90% of its weight, of sintered particles. Preferably, the granules of the granulate are sintered particles.

Preferably, the granulate has
an apparent density above 3.0 $g/cm^3$; preferably above 3.3 $g/cm^3$, or even above 3.5 $g/cm^3$, or even above 3.6 $g/cm^3$; and/or
an apparent density greater than 85% of the theoretical density, preferably greater than 88%, preferably greater than 90%, preferably greater than 91%, preferably greater than 92% of the theoretical density, or even greater than 93%, or even greater than 94%, or even greater than 95%, or even greater than 96% of the theoretical density (advantageously, this results in improved flowability of the particulate mixture); and/or
an open pore volume below 10%, preferably below 6%, preferably below 5%, preferably below 3%, preferably below 2%, preferably below 1%, or even below 0.7%, or even below 0.6%. This results in improved corrosion resistance of the refractory product obtained from the refractory mixture, notably through contact with molten glass.

Also preferably, more than 80%, preferably more than 90%, preferably more than 95%, preferably more than 99 wt % of the granules, or of the grains, of the granulate, preferably roughly all the granules of the granulate, or even roughly all the grains of the granulate are larger than 200 μm, preferably larger than 300 μm, preferably larger than 400 μm, or even larger than 0.5 mm and/or smaller than 10 mm, preferably smaller than 5 mm.

Also preferably, the particulate mixture contains at least 10% of grains larger than 2 mm, in percentage by weight.

Preferably, the granulate has:
a median circularity greater than 0.88, preferably greater than 0.90, preferably greater than 0.91, preferably greater than 0.92, preferably greater than 0.93 (advantageously, this results in improved resistance to thermal shock); and/or
a circularity $Ci_{10}$ greater than 0.72, preferably greater than 0.74, preferably greater than 0.76, preferably greater than 0.78, preferably greater than 0.80, preferably greater than 0.82; and/or
a median convexity $Co_{50}$ greater than 0.90, preferably greater than 0.92, preferably greater than 0.94, preferably greater than 0.95, preferably greater than 0.96; and/or
a convexity $Co_{10}$ greater than 0.80, preferably greater than 0.82, preferably greater than 0.85, preferably greater than 0.88, preferably greater than 0.90; and/or
a median circularity greater than 0.90, preferably greater than 0.92, and an open pore volume less than 2%, preferably less than 1%.

Preferably, the characteristics relating to the chemical composition of a granulate as defined above, and in particular the aforementioned optional characteristics, are applicable to more than 80%, more than 90%, or even more than 95% or more than 99 wt %, or roughly 100% of the grains of said granulate.

Additive

The particulate mixture can further contain at least 0.1 wt % of a forming additive.

The additive can in particular be selected from the group comprising:
- clays;
- plasticizers, such as polyethylene glycol (or "PEG") or polyvinyl alcohol (or "PVA");
- cements, preferably with high alumina content;
- hydratable aluminas, such as boehmite;
- binders, including organic temporary binders such as resins, lignosulfonates, carboxymethylcellulose or dextrin;
- defloceulating agents, such as polyphosphates of alkali metals, polyacrylates of alkali metals,
- polycarboxylates; and
- mixtures of these products.

Preferably, the forming additive is selected from the group comprising cements, deflocculating agents, clays, lignosulfonates, PVA and mixtures thereof.

Preferably, the content of forming additive is less than 6%, in percentage by weight based on the particulate mixture.

Manufacture of a Particulate Mixture According to the Invention

Sintered particles, and in particular a granulate of sintered particles, can be made by a conventional method having the following successive steps:
a) preparing an initial charge by mixing raw materials and water;
b) forming said initial charge so as to form a set of particles;
c) sintering the particles obtained in step b).

An example of a method is described in detail in the examples.

In step a), the mixture of raw materials is adjusted so as to obtain particles having the desired chemical composition. Any mixing means can be used, for example a mixer or an intensive mixer.

In step b), preferably, the forming does not comprise a spraying operation. Such a method leads in fact to a low density. A spraying operation also leads to particles of small size, which makes it difficult to produce spherical grains.

Step b) can comprise a granulation operation. Such an operation cannot however guarantee obtaining a median circularity greater than 0.87 and a density greater than 85% of the theoretical density. To obtain such a result, a mixer of the intensive type is preferably used, preferably with an outer tip linear speed greater than 6 m/s, and with sequential feed of said mixer with initial charge.

In step c), the particles are sintered, for example in a firing kiln. All firing kilns can be used, for example intermittent kilns, but also rotary kilns. The sintering parameters are determined as a function of the composition of the particles.

The sintering temperature can be between 1400° C. and 1700° C. Sintering can be carried out in air, but also in neutral conditions (under nitrogen for example), or even in reducing conditions (for example under excess of carbon monoxide). Preferably, sintering is carried out in air.

The holding time at temperature can be between 1 hour and 10 hours, preferably between 2 hours and 5 hours.

The open pore volume of the powder can be adjusted by varying the granulometric distribution of the particulate raw materials used, or by acting on the plateau temperature and/or time during sintering.

Method of Manufacture of a Refractory Product

A refractory mixture according to the invention can be used advantageously for making products having a granulate bound by a binding matrix.

For this purpose, a method comprising steps A) to C) described above can be used. This method advantageously makes it possible to manufacture a sintered refractory product having an apparent density between 3.1 and 4.5 $g/cm^3$, preferably between 3.3 and 4.3 $g/cm^3$. The Andréasen or Fuller-Bolomey compaction models can be used for modifying the apparent density of the sintered refractory products. These models of compaction are notably described in the work with the title "Traité de céramiques et matériaux minéraux", C. A. Jouenne, Editions Septima. Paris (1984), pages 403 to 405.

In step A), matrix particles and grains are mixed, preferably with a forming additive, to form the initial charge.

Preferably, the grains comprise granules as described above, preferably consolidated thermally, preferably sintered. The granules can thus advantageously preserve their spherical shape during handling.

The particulate mixture can also be supplied ready-to-use. All that is then required is to mix it with water to prepare the initial charge.

The amount of water depends on the method used in step B).

In the case of forming by cold pressing, addition of an amount of water between 1.5% and 4%, in percentage by weight based on the particulate mixture without the additives, is preferred. In the case of forming involving a hydraulic bond, for example casting, addition of an amount of water between 3 and 7%, in percentage by weight based on the particulate mixture without the additives, is preferred.

Without being able to explain it theoretically, the inventors discovered that the roughly spherical shape of the granules improves the resistance to thermal shock, independently of the open pore volume of the powder.

The inventors also discovered that the open pore volume of the granulate influences the flowability of the initial charge. In fact, although substitution of grains of chamotte with a granulate having an open pore volume greater than 10% leads to a degradation of the flowability, inexplicably, when the open pore volume of the granulate used is less than 6%, the flowability is greater than that of the conventional products with chamotte grains. The flowability is further improved when the open pore volume is less than 2%.

In step C), the sintering conditions, and in particular the sintering temperature, depend on the composition of the particulate mixture. Usually a sintering temperature between 1400° C. and 1700° C., preferably between 1500° C. and 1600° C., is very suitable.

At the end of step C), a sintered refractory product according to the invention is obtained.

Figure 2:
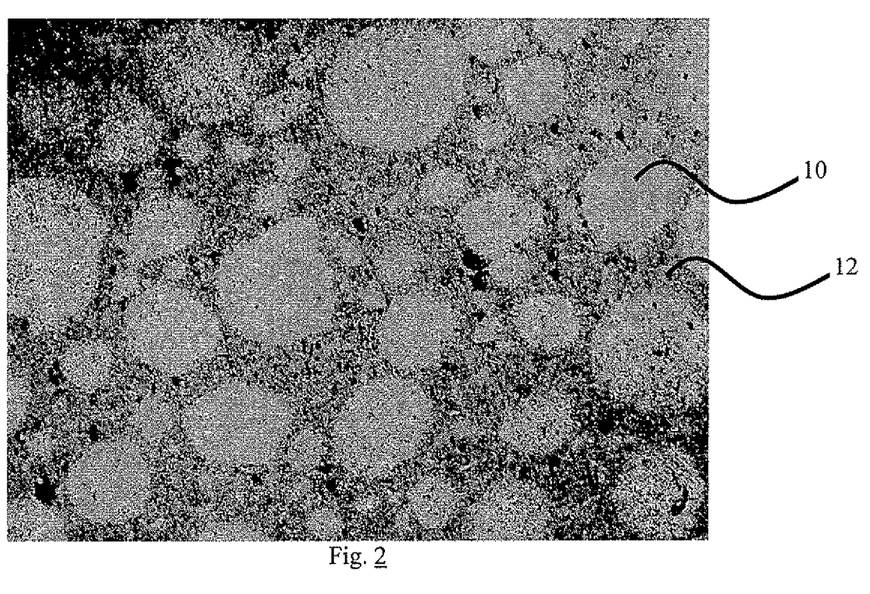
FIG. 2 shows a photograph of a section through a refractory product according to the invention.

Such a product is shown in FIG. 2. In particular the particles 10 according to the invention, roughly circular, and the matrix 12 are clearly discernible.

The sintered refractory product can have an apparent density above 3.00, above 3.10, above 3.30, above 3.50, and/or below 4.30, or below 4.20.

It can have an open pore volume above 10%, above 12%, above 14%, and/or below 20%, below 18%, or even below 15%.

The properties of this product make it particularly suitable for use in a glass furnace, a regenerator, or a feeder channel.

A sintered product according to the invention can be used in the form of a block or a layer, for example in the form of a lining applied, by any known method, on a wall that is to be protected. The sintering can be carried out in situ, i.e. after the product has been placed in its working position.

EXAMPLES

For making the "chromium oxide, alumina, silica, titanium oxide" grains used in the products of examples 2, 3, 4, 6, 7, 8 and 9 mentioned below, the following raw materials were used:
- pigment-grade chromium oxide $Cr_2O_3$ of purity above 95%, having a specific surface equal to 4 $m^2/g$ and a median size of 0.7 μm;
- alumina $Al_2O_3$ of purity above 99%, having a specific surface equal to 7 $m^2/g$, and a median size of 0.6 μm;
- fumed silica, of purity above 92%;
- titanium oxide, in the rutile form, of purity above 93% and having a median size of 1.5 μm.

These raw materials were dosed and mixed so as to have the desired chemical composition.

For each example, 3000 g of mixture of oxides, 350 g of water and 150 g of polyvinyl alcohol (PVA) are put in an Eirich RV02 mixer.

The whole is then mixed for 1 minute, with a rotor tool rotating at 300 rev/min and a bowl set at 43 rev/min in order to obtain a homogeneous mixture. The rotary speed of the rotor tool is then increased to 1050 rev/min, and an additional amount of 900 grams of the mixture of oxides is then added gradually in one minute. Rotation is maintained for 2 minutes after addition of the additional amount of charge has ended. The particles are then discharged and dried in air for 24 h at 110° C. before being sintered at 1550° C. for a holding time at temperature of 3 hours, in air, with a rate of temperature increase and a rate of temperature decrease of 50° C./h. After sintering, the particles are sieved and the granulometric fraction 0.5-5 mm is kept.

The "chromium oxide, alumina, silica, titanium oxide" grains used in the product of example 10 were manufactured by extrusion of the same mixture as that used in manufacture of the grains used in the product of example 9, so as to obtain extruded cakes. These extruded cakes were then sintered in air in a thermal cycle having a plateau of 3 hours at 1550° C., and were finally ground and sieved to obtain the granulometric fraction 0.5-5 mm.

Sintered refractory products were then manufactured following the above steps A) to C).

In step A), the initial charge was prepared by mixing an amount of water between 4.1% and 4.7% with a particulate mixture adjusted for the desired chemical composition. The following raw materials were used:
- "AZS" grains of the electrocast refractory product ER-1681 manufactured and sold by Société Européenne des Produits Réfractaires, containing in percentage by weight based on the oxides: 32.5% of $ZrO_2$, 51% of $Al_2O_3$, 15% of $SiO_2$ and 1.3% of $Na_2O$ (used in the product of example 1), with maximum size under 5 mm;
- "AZS-Cr" grains of the electrocast refractory product ER-2161 manufactured by SociétéEuropéenne des Produits Réfractaires, containing in percentage by weight based on the oxides: 27% of $Cr_2O_3$, 27% of $ZrO_2$, 28% of $Al_2O_3$, 14.5% of $SiO_2$ and 1.1% of $Na_2O$ (used in the product of example 5), with maximum size under 5 mm;
- "High chrome" grains containing 92% of $Cr_2O_3$ and having an open pore volume below 3% (used in the product of example 1*), with maximum size under 5 mm;
- "High chrome" grains containing 98% of $Cr_2O_3$ and having an open pore volume below 3% (used in the product of example 5*), with maximum size under 5 mm;
- "Chromium oxide, alumina, silica, titanium oxide" grains, with maximum size under 5 mm, with—depending on the products of the examples in question—the characteristics shown in Table 1 below:

TABLE 1

| | "Chromium oxide, alumina, silica, titanium oxide" grains used in the product of example: | | | | | | | |
|---|---|---|---|---|---|---|---|---|
| | 2 | 3 | 4 | 6 | 7 | 8 | 9 | 10 |
| $Cr_2O_3$ (%) | 13.9 | 16.1 | 21.4 | 39.6 | 57.5 | 87.3 | 52 | 52.1 |
| $Al_2O_3$ (%) | 83.9 | 81.7 | 74.7 | 53.7 | 37.5 | 6.37 | 43.7 | 43.3 |
| $SiO_2$ (%) | 0.75 | 0.8 | 1.52 | 2.22 | 2.38 | 3.78 | 2.2 | 2.4 |
| $TiO_2$ (%) | 0.62 | 0.65 | 1.4 | 1.26 | 1.89 | 1.91 | 1.62 | 1.51 |
| Others (%) | 0.83 | 0.75 | 0.98 | 0.38 | 0.73 | 0.64 | 0.48 | 0.69 |
| Open pore volume (%) | 4.02 | 3.58 | 5.08 | 1.56 | 0.9 | 0.6 | 1.02 | 1.47 |
| Granules | Yes | Yes | Yes | Yes | Yes | Yes | Yes | No |

Pigment-grade chromium oxide $Cr_2O_3$ of purity above 95%, having a specific surface equal to 4 $m^2/g$ and a median size of 0.7 μm;

Alumina $Al_2O_3$ of purity above 99%, having a specific surface equal to 7 $m^2/g$, and a median size of 0.6 μm;

Zirconia, of purity above 98.5% having a median size of 3 μm;

Titanium oxide, in the rutile form, of purity above 93% and having a median size of 1.5 μm.

3% of a forming additive (aluminous cement CA25 marketed by ALMATYS) was added to the initial charge.

In step B), the initial charge was formed by a vibratory casting technique in the form of a preform with dimensions suitable for the measurement to be performed.

In step C), the preform obtained was dried and then sintered in air at a temperature of 1550° C., for 10 hours.

The following measurements were carried out:

The open pore volume of a set of particles was measured by the following method:

Dry at 110° C. for at least 12 hours, 4 samples of 35 grams each consisting of particles whose size is between 2 and 5 mm. The dry weight of each of the samples is designated $Ps_1$, $Ps_2$, $Ps_3$ and $Ps_4$. Note that $Ps=Ps_1+Ps_2+Ps_3+Ps_4$.

Put each sample in a bottle.

Using a vacuum pump, create a vacuum of at least 0.07 MPa in each bottle and maintain this vacuum for 7 minutes. Then add water to the bottle so as to cover the particles with at least 2 cm of water, which means that the particles are always covered with water during subsequent vacuuming.

Create a vacuum of 0.08 MPa again in each bottle containing the particles and water, and maintain this vacuum for 7 minutes. Break the vacuum.

Create a vacuum of 0.08 MPa again in each bottle, and maintain this vacuum for 7 minutes. Break the vacuum.

Create a vacuum of 0.08 MPa again in each bottle, and maintain this vacuum for 7 minutes. Break the vacuum.

Determine the immersed weight of each sample, $Pi_1$, $Pi_2$, $Pi_3$ and $Pi_4$. Note that $Pi=Pi_1+Pi_2+Pi_3+Pi_4$.

Then pour the contents of the 4 bottles onto a 2 mm square mesh sieve to remove the water. Then pour the particles onto a dry cotton cloth in order to remove the excess water and dry the particles until the wetness luster has disappeared from their surface.

Determine the wet weight Ph of the set of particles.

The open pore volume of the set of particles is equal to (Ph−Ps)/(Ph−Pi).

These measurements are always carried out on sets of sintered particles. They correspond to average measurements on the material constituting the particles, i.e. do not take into account the interstices between the various particles.

The apparent density and the open pore volume of a sintered product were measured on specimens with the dimensions $125 \times 25 \times 25$ mm$^3$, according to standard ISO 5017.

The circularities $Ci_{50}$ and $Ci_{10}$ and the convexities $Co_{50}$ and $Co_{10}$ of a set of particles can be evaluated by the following method:

A sample of particles having sizes between 0.5 and 2 mm is poured onto the glass plate provided for this purpose of a Morphologi® G3 instrument marketed by the company Malvern. The magnification selected is 1×. The analysis is started. In order to avoid recording any scratches on the glass plate and dust, the measurements corresponding to particles having a width of less than 0.4 mm are eliminated from the count by creating a filter ("width<400"). The number of particles recorded after filtering is greater than 250.

The instrument provides an evaluation of the distribution of the circularities ("Circularity") and of the convexities ("Convexity"), the particles being counted by number.

It is also possible to estimate the distribution of the circularities and convexities of the particles present in a sintered product by analyzing images of a section of said product, as shown in FIG. 2.

The chemical analyses were performed by X-ray fluorescence for constituents whose content is above 0.5%. The content of constituents present at a content below 0.5% was determined by AES-ICP (Atomic Emission Spectroscopy-Inductively Coupled Plasma).

For measuring the average corrosion rate and the roughness index, samples in the form of cylindrical bars with an initial radius $r_o$ equal to 11 mm and a height of 100 mm were taken and were submitted to a test consisting of rotating the samples immersed in a bath of molten glass, heated to a temperature T determined in relation to the composition of said glass. The speed of rotation of the samples was 6 revolutions per minute. The samples were kept immersed for a time "t". At the end of this time and after cooling, the portion of a sample that was immersed in the glass (with height H equal to 30 mm) has a cross section in the form of an ellipse with minor axis Pa and major axis Ga. The following are determined for each sample: minimum value of Pa (Pam) in mm, maximum value of Pa (PaM) in mm, minimum value of Ga (Gam) in mm and maximum value of Ga (GaM) in mm. The following are fixed: $Pa_{ave}=(Pam+PaM)/2$ and $Ga_{ave}=(Gam+GaM)/2$. For each sample the average volume remaining $Vr_{ave}$ is determined from the formula $Vr_{ave}=(\pi \cdot H \cdot Pa_{ave} \cdot Ga_{ave})/4$. For each sample, the average volume corroded $Vc_{ave}$ is then determined from the formula $$Vc_{ave}=[(\pi \cdot H \cdot 22)/4]-Vr_{ave}.$$

For each sample, the average corrosion rate Vu, expressed in μm/h, is determined from the formula:

$$Vu = \frac{r_0 - \sqrt{r_0^2 - \left(\frac{Vc_{ave}}{\pi H}\right)}}{t}.$$

The average corrosion rate "Vu" of a sample gives an evaluation of the corrosion resistance of the specimen tested. Thus, the lower the corrosion rate of a sample, the higher its resistance to corrosion by molten glass.

The roughness index Ir of sample i, $Ir_i$, is determined from the following formula:

$$Ir_i=[100 \cdot (Vc_{ave} \text{ reference sample})/(Vc_{ave} \text{ reference sample} - \Delta V \text{ sample } i)]-100,$$

in which $\Delta V=(Vc_{ave}-VcM)$.

The standardized test PRE III,26/PRE/R,5,1/78 was used for evaluating the resistance to thermal shock by measuring the relative loss of bending strength (% Loss MOR) after one or more thermal cycles. Each thermal cycle consists of heating the test specimen from room temperature to a temperature T of 800° C., holding it at this temperature T for 30 minutes, then plunging it into cold water. The test specimens are bars of $125 \times 25 \times 25$ mm$^3$ that do not have a skin face.

The bending strength was measured according to standard ISO 5014. For a given composition, the measurement of initial bending strength of the test specimens (not yet submitted to thermal shock), or "MOR initial", is the average value measured on 3 identical test specimens. The measurement of resistance after thermal shock at 800° C., or "MOR after TS", is the average value of bending strength measured at room temperature on 3 test specimens after they have been submitted to said thermal shock. The measurement of the relative loss of bending strength, or "% Loss MOR", is given by the following formula:

% Loss *MOR*=100·(*MOR* after *TS*–*MOR* initial)/(*MOR* initial)

The characteristics of the particulate mixtures tested and the test results are shown in Table 2 below:

TABLE 2

| | | | Example | | | | | | | | | |
|---|---|---|---|---|---|---|---|---|---|---|---|---|
| | | | 1* | 2 | 3 | 4 | 5* | 6 | 7 | 8 | 9 | 10 |
| | | | Particulate mixture | | | | | | | | | |
| Matrix | % Cr$_r$ | | 33.1 | 20.1 | 25.4 | 31 | 61.8 | 43.7 | 62 | 80.5 | 61.2 | 61.4 |
| | Composition | | Cr$_2$O$_3$ Al$_2$O$_3$ Cement | Cr$_2$O$_3$ Al$_2$O$_3$ Cement | Cr$_2$O$_3$ Al$_2$O$_3$ Cement | Cr$_2$O$_3$ Al$_2$O$_3$ Cement | Cr$_2$O$_3$ Al$_2$O$_3$ Cement | Cr$_2$O$_3$ Al$_2$O$_3$ Cement | Cr$_2$O$_3$ Al$_2$O$_3$ Cement ZrO$_2$ | Cr$_2$O$_3$ Al$_2$O$_3$ Cement TiO$_2$ | Cr$_2$O$_4$ Al$_2$O$_4$ Cement | Cr$_2$O$_5$ Al$_2$O$_5$ Cement |
| | Amount of matrix (%) | | 31 | 24 | 24 | 28 | 35 | 32 | 37 | 32 | 35 | 35 |
| | % Cr$_M$ | | 50 | 40.6 | 53.4 | 55.7 | 67 | 55.6 | 68.8 | 64 | 72 | 72 |
| | Conditions met | | (I), (V) and (VI) | (I), (V) and (VI) | (I), (V) and (VI) | (I), (V) and (VI) | (I), (V) and (VI) | (I), (V) and (VI) | (I), (V) and (VI) | (I), (V) and (VI) | (I) | (I) |
| | Median diameter (µm) | | 2.7 | 3.2 | 2.8 | 2.6 | 1.9 | 2.5 | 2.2 | 2.2 | 2 | 2 |
| Grains | Amount of grains | | 69 | 76 | 76 | 72 | 65 | 68 | 63 | 68 | 65 | 65 |
| | Composition | | AZS high chrome | Chromium oxide, alumina, silica, titanium oxide | | | AZS-Cr high chrome | Chromium oxide, alumina, silica, titanium oxide | | | Chromium oxide, alumina, silica, titanium oxide | Chromium oxide, alumina, titanium oxide |
| | % Cr$_O$ | | 0 | 13.5 | 16 | 20 | 27 | 40 | 58 | 88 | 52.1  88 | 52  88 |
| | Conditions met | | None | (II), (III), (IV), (VII) and (VIII) | (II), (III), (IV), (VII) and (VIII) | (II), (III), (IV), (VII) and (VIII) | (II) | (II), (III), (IV), (VII) and (VIII) | (II), (III), (IV), (VII) and (VIII) | (II), (III), (IV), (VII) and (VIII) | (II), (III), (IV), (VII) | (II), (III), (IV), (VII) |
| | % of grains meeting said conditions | | — | (II): 100% (III): 100% (IV): 0% (VII): 100% (VIII): 100% | (II): 100% (III): 100% (IV): 0% (VII): 100% (VIII): 100% | (II): 100% (III): 100% (IV): 0% (VII): 100% (VIII): 100% | (II): 100% | (II): 100% (III): 100% (IV): 0% (VII): 100% (VIII): 100% | (II): 100% (III): 100% (IV): 0% (VII): 100% (VIII): 100% | (II): 100% (III): 100% (IV): 0% (VII): 100% (VIII): 100% | (II): 100% (III): 91% (IV): 0% (VII): 91% | (II): 100% (III): 91% (IV): 0% (VII): 91% |
| | Median diameter (mm) | | 1.6 | 1.7 | 1.7 | 1.6 | 1.6 | 1.7 | 2 | 1.7 | 1.7 | 1.7 |
| | | | Sintered article obtained after sintering the particulate mixture | | | | | | | | | |
| | % Cr$_2$O$_3$ | | 33.1 | 20.1 | 25.4 | 31.0 | 61.8 | 43.7 | 62.0 | 80.5 | 61.2 | 61.4 |
| | % Al$_2$O$_3$ | | 38.5 | 77.3 | 72 | 65.3 | 16.5 | 52.9 | 29.6 | 5.76 | 33.18 | 33.13 |
| | % ZrO$_2$ | | 17.4 | 0.05 | 0.05 | 0.07 | 11.8 | 0.1 | 4.43 | 7.81 | 1.31 | 1.25 |
| | % SiO$_2$ | | 8.78 | 0.71 | 0.78 | 1.30 | 7.10 | 0.85 | 1.28 | 2.59 | 1.36 | 1.29 |
| | % TiO$_2$ | | 0.46 | 0.48 | 0.53 | 1.04 | 0.70 | 1 | 1.38 | 2.08 | 1.21 | 1.3 |
| | % CaO | | 0.95 | 0.59 | 0.59 | 0.61 | 0.90 | 0.91 | 0.93 | 0.93 | 0.83 | 0.79 |
| | % Other elements | | 0.81 | 0.77 | 0.65 | 0.68 | 1.2 | 0.54 | 0.38 | 0.33 | 0.91 | 0.84 |
| | Apparent density (g/cm$^3$) | | 3.30 | 3.30 | 3.38 | 3.51 | 3.65 | 3.60 | 3.81 | 4.10 | 3.66 | 3.73 |
| | Open pore volume (%) | | 16 | 16.3 | 14.7 | 14 | 14.5 | 15.8 | 15.5 | 14.7 | 14.9 | 15 |
| Glass C, T = 1450° C., t = 100 h | Average corrosion rate Vu, in µm/h | | 27.7 | 28.2 | 24.8 | 20.1 | — | — | — | — | — | — |
| | Roughness index Ir | | 25 | 5 | 4 | 3 | — | — | — | — | — | — |

TABLE 2-continued

| | | Example | | | | | | | | | |
|---|---|---|---|---|---|---|---|---|---|---|---|
| | | 1* | 2 | 3 | 4 | 5* | 6 | 7 | 8 | 9 | 10 |
| Glass C, T = 1450° C., t = 120 h | Average corrosion rate Vu, in μm/h | — | — | — | — | 8.4 | 7.5 | 6 | — | 6 | 7 |
| | Roughness index Ir | — | — | — | — | 20 | 6 | 3 | — | 3 | 4 |
| Glass C, T = 1480° C., t = 100 h | Average corrosion rate Vu, in μm/h | — | — | — | — | 10.1 | — | — | 7.2 | — | — |
| | Roughness index Ir | — | — | — | — | 18 | — | — | 7 | — | — |
| % Loss MOR before/after thermal shock at 800° C. (%) | | — | — | — | — | — | — | — | — | 45 | 65 |

*not according to the invention

A roughness index below 15 is representative of wear that is regular and uniform.

Comparison of the products of examples 1* and 4 shows that for similar total contents of chromium oxide, the product according to example 4 has, after corrosion testing, a roughness index more than three times lower than that of example 1* as well as remarkable corrosion resistance. Comparison of the products of examples 5* on the one hand and 7 and 9 and 10 on the other hand leads to a similar conclusion, but example 7 comprises zirconia.

Comparison of the products of examples 1* on the one hand and 2 and 3 on the other hand shows that the products according to examples 2 and 3 have a roughness index far lower than that of the product of example 1*. Moreover, despite a lower chromium content, the products according to examples 2 and 3 display a resistance to corrosion by molten glass similar to or greater than that of example 1*.

The same finding can be made on comparing the products of examples 6 and 5*.

Comparison of the product of example 5* with the product of example 8 shows that the latter, which comprises titanium oxide, has a much lower roughness index.

Finally, comparison of the products of examples 9 and 10 shows that the product of example 9, comprising 91% of granules, based on the weight of the grains, displays higher resistance to thermal shock than that of example 10, which has practically no grains, with roughly equivalent average corrosion rate and roughness index.

As is now clear, the invention supplies a particulate mixture for making refractory products that are particularly suitable for being in contact with molten glass. In use, these products wear remarkably uniformly, which leads to a considerable increase in their service life.

Of course, the invention is not limited to the examples supplied for purposes of illustration.

The invention claimed is:

1. A device selected from a glass furnace and a glass distribution channel comprising:
a block and/or a lining of a sintered product obtained by sintering a particulate mixture consisting of a matrix fraction and a granulate constituted respectively of matrix particles being particles having a size less than or equal to 50 μm, and of grains being particles having a size greater than 50 μm, the matrix fraction representing more than 10% and less than 45% of the weight of the particulate mixture,
said particulate mixture having a content of $Cr_2O_3+Al_2O_3$ greater than 60%, in percentage by weight based on the oxides, and having a chromium oxide content, designated "$Cr_T$", between 10% and 82%, in percentage by weight based on the oxides of the refractory mixture,
the matrix fraction of said particulate mixture being such that $$0.39 \cdot (Cr_T)+24 < Cr_M < 0.39 \cdot (Cr_T)+52 \quad (I),$$

$Cr_M$ denoting the content by weight of chromium oxide in the matrix fraction, in percentage by weight based on the oxides of the matrix, and
the granulate being such that $x_{II} \geq 97\%$, $x_{III} \geq 70\%$, and $x_{IV} \leq x_{III} - 70\%$
$Cr_G$ denoting the content by weight of chromium oxide in a grain, in percentage by weight based on the oxides of said grain, $x_{II}$ denoting the amount, in percentage by weight based on the granulate, of grains meeting the following condition (II):

if $10\% \leq Cr_T \leq 30\%$, then $Cr_G \leq 0.018 \cdot (Cr_T)^2 - 0.390 \cdot (Cr_T)+58.8$;

if $30\% < Cr_T \leq 60\%$, then $Cr_G \leq 1.22 \cdot (Cr_T)+26.7$;

if $60\% < Cr_T \leq 82\%$, then $Cr_G \leq 100$, \quad (II)

$x_{III}$ denoting the amount, in percentage by weight based on the granulate, of grains meeting the following condition (III):

if $10\% \leq Cr_T \leq 30\%$, then $0.018 \cdot (Cr_T)^2 - 0.390 \cdot (Cr_T)+9.10 \leq Cr_G \leq 0.018 \cdot (Cr_T)^2 - 0.390 \cdot (Cr_T)+25.10$;

if $30\% < Cr_T \leq 60\%$, then $1.17 \cdot (Cr_T)-21.5 \leq Cr_G \leq 1.17 \cdot (Cr_T)-5.5$;

if $60\% < Cr_T \leq 82\%$, then $1.17 \cdot (Cr_T)-21.5 \leq Cr_G \leq 1.67 \cdot (Cr_T)-35.5$, \quad (III)

$x_{IV}$ denoting the amount, in percentage by weight based on the granulate, of grains meeting the following condition (IV):

If $10\% \leq Cr_T \leq 30\%$, then $0.018 \cdot (Cr_T)^2 - 0.390 \cdot (Cr_T)+9.10 > Cr_G$;

If $30\% < Cr_T \leq 60\%$, then $1.17 \cdot (Cr_T)-21.5 > Cr_G$;

If $60\% < Cr_T \leq 82\%$, then $1.17 \cdot (Cr_T)-21.5 > Cr_G$. \quad (IV)

2. The device as claimed in claim 1, wherein the grains containing chromium oxide of said particulate mixture are sintered particles.

3. The device as claimed in claim 1, the granulate of said particulate mixture having a median circularity greater than 0.87.

4. The device as claimed in claim 3, said particulate mixture being such that $x_{II} \geq 99\%$.

5. The device as claimed in claim 1, said particulate mixture being such that $$0.39 \cdot (Cr_T)+29 < Cr_M < 0.39 \cdot (Cr_T)+47 \quad (V).$$

6. The device as claimed in claim 5, said particulate mixture being such that $$0.39 \cdot (Cr_T)+32 < Cr_M < 0.39 \cdot (Cr_T)+44.5 \quad (VI).$$

7. The device as claimed in claim 1, at least 70 wt % of the grains of said particulate mixture having, in percentage by weight based on the oxides, a chromium oxide content meeting the following condition (VII):

If $10\% \leq Cr_T \leq 30\%$, then $0.018 \cdot (Cr_T)^2 - 0.390 \cdot (Cr_T)+13.10 \leq Cr_G \leq 0.018 \cdot (Cr_T)^2 - 0.390 \cdot (Cr_T)+21.10$;

If $30\% < Cr_T \leq 60\%$, then $1.17 \cdot (Cr_T)-17.5 \leq Cr_G \leq 1.17 \cdot (Cr_T)-9.5$;

If $60\% < Cr_T \leq 82\%$, then $1.67 \cdot (Cr_T)-51.5 \leq Cr_G \leq 1.67 \cdot (Cr_T)-39.5$.

8. The device as claimed in claim 7, said particulate mixture being such that, in said condition (VII), if $60\% \leq Cr_T \leq 82\%$, then $1.67 \cdot (Cr_T)-47.5 \leq Cr_G$.

9. The device as claimed in claim 1, at least 90 wt % of the grains of said particulate mixture having a content of chromium oxide "$Cr_G$" meeting condition (III)

If $10\% \leq Cr_T \leq 30\%$, then $$0.018 \cdot (Cr_T)^2 - 0.390 \cdot (Cr_T) + 9.10 \leq Cr_G \leq 0.018 \cdot (Cr_T)^2 - 0.390 \cdot (Cr_T) + 25.10;$$

If $30\% < Cr_T \leq 60\%$, then $1.17 \cdot (Cr_T) - 21.5 \leq Cr_G \leq 1.17 \cdot (Cr_T) - 5.5;$ If $60\% < Cr_T \leq 82\%$, then $1.17 \cdot (Cr_T) - 21.5 \leq Cr_G \leq 1.67 \cdot (Cr_T) - 35.5;$ and/or condition (VII)

If $10\% \leq Cr_T \leq 30\%$, then $$0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10;$$

If $30\% < Cr_T \leq 60\%$, then $1.17 \cdot (Cr_T) - 17.5 \leq Cr_G \leq 1.17 \cdot (Cr_T) - 9.5;$ If $60\% < Cr_T \leq 82\%$, then $1.67 \cdot (Cr_T) - 51.5 \leq Cr_G \leq 1.67 \cdot (Cr_T) - 39.5.$ 10. The device as claimed in claim 1, said particulate mixture being such that, whatever oxide constituting the particulate mixture is considered, provided that its content is greater than 1% in percentage by weight based on the oxides, the standard deviation of the distribution of its content among the various grains of said particulate mixture is less than 8.

11. The device as claimed claim 1, said particulate mixture having a content of $Cr_2O_3 + Al_2O_3$ greater than 80%, in percentage by weight based on the oxides.

12. The device as claimed in claim 1, at least 70 wt % of the grains of said particulate mixture having, in percentages by weight based on the oxides, a chromium oxide content meeting the following condition (VII):

If $10\% \leq Cr_T \leq 30\%$, then $$0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10;$$

If $30\% < Cr_T \leq 60\%$, then $1.17 \cdot (Cr_T) - 17.5 \leq Cr_G \leq 1.17 \cdot (Cr_T) - 9.5;$ If $60\% < Cr_T \leq 82\%$, then $1.67 \cdot (Cr_T) - 51.5 \leq Cr_G \leq 1.67 \cdot (Cr_T) - 39.5.$ 13. The device as claimed in claim 12, said particulate mixture having a content of $Cr_2O_3 + Al_2O_3$ greater than 90%, in percentage by weight based on the oxides.

14. The device as claimed in claim 1,
the matrix fraction of said particulate mixture consisting of particles comprising chromium oxide; and/or
the granulate formed by the grains of said particulate mixture consisting of particles comprising chromium oxide.

15. The device as claimed in claim 1, at least 80 wt % of the grains of said particulate mixture having a chemical composition in percentages by weight based on the oxides and for a total of 100%, comprising:
$Cr_2O_3 + Al_2O_3 + ZrO_2 + MgO + Fe_2O_3 + SiO_2 + TiO_2 \geq 90\%$,
$Cr_2O_3 + Al_2O_3 + MgO \geq 60\%$,
$Cr_2O_3 \geq 9\%$,
$20\% \geq SiO_2 \geq 0.1\%$, and
other oxides: $\leq 10\%$.

16. The device as claimed in claim 1, the matrix fraction of said particulate mixture consisting of a set of particles of chromium oxide and of a set of particles of alumina and/or of particles of zirconia and/or of particles of magnesia and/or of particles of iron oxide and/or of particles of titanium oxide and/or of particles of silica and/or of particles of calcium oxide, or consisting of a set of particles composed of chromium oxide and of a set of particles composed of alumina and/or of zirconia and/or of magnesia and/or of iron oxide and/or of titanium oxide and/or of silica and/or of calcium.

17. The device as claimed in claim 1, the granulate of said particulate mixture having an apparent density greater than 85% of the theoretical density and/or an open pore volume below 3%.

18. The device as claimed in claim 1, said particulate mixture being such that $Cr_T \leq 80\%$.

19. The device as claimed in claim 14, wherein the particles of the matrix fraction of said particulate mixture further comprise alumina and/or zirconia and/or magnesia and/or iron oxide and/or titanium oxide and/or silica and/or calcium oxide; and/or the particles of the granulate formed by the grains of said particulate mixture further comprise alumina and/or zirconia and/or magnesia and/or iron oxide and/or titanium oxide and/or silica.

* * * * *